(12) United States Patent
Bae et al.

(10) Patent No.: US 6,987,462 B2
(45) Date of Patent: Jan. 17, 2006

(54) REMOTE CONTROL SYSTEM FOR HOME APPLIANCES AND METHOD THEREOF

(75) Inventors: Yu Seok Bae, Taejon (KR); Kyeong Deok Moon, Taejon (KR); Bong Jin Oh, Taejon (KR); Chae Kyu Kim, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 281 days.

(21) Appl. No.: 10/271,723

(22) Filed: Oct. 17, 2002

(65) Prior Publication Data

US 2003/0076240 A1    Apr. 24, 2003

(30) Foreign Application Priority Data

Oct. 23, 2001    (KR) .......................... 2001-0065339

(51) Int. Cl.
*G08C 19/00*    (2006.01)
*G05B 19/02*    (2006.01)
*H04Q 5/22*    (2006.01)

(52) U.S. Cl. .................... 340/825.72; 340/825.69; 340/825.22; 340/10.1

(58) Field of Classification Search ........... 340/825.72, 340/825.69, 825.22, 825.49, 10.1, 10.2, 10.3, 340/10.4, 10.5, 10.51, 10.52; 704/275, 270; 348/734, 906

See application file for complete search history.

(56) References Cited

U.S. PATENT DOCUMENTS

| | | | | |
|---|---|---|---|---|
| 5,583,965 A | * | 12/1996 | Douma et al. .............. 704/275 |
| 6,133,847 A | * | 10/2000 | Yang ....................... 340/825.22 |
| 6,407,779 B1 | * | 6/2002 | Herz ...................... 340/825.69 |
| 6,549,143 B1 | * | 4/2003 | O'Donnell et al. .... 340/825.69 |
| 6,563,430 B1 | * | 5/2003 | Kemink et al. ......... 340/825.49 |
| 6,629,077 B1 | * | 9/2003 | Arling et al. ............... 704/275 |
| 6,747,566 B2 | * | 6/2004 | Hou ....................... 340/825.69 |

FOREIGN PATENT DOCUMENTS

KR    1998-53151    9/1998

* cited by examiner

*Primary Examiner*—Michael Horabik
*Assistant Examiner*—Nam Nguyen
(74) *Attorney, Agent, or Firm*—Mayer, Brown, Rowe & Maw LLP

(57) ABSTRACT

Disclosed are system and method of remotely controlling the home appliance by employing the voice/character recognition technique. The appliance detects a connection relationship between the appliance and the mobile terminal and dynamically transmits the control code and a module for transmission. If the appliance control command is inputted through the voice control command input screen or the handwriting control command input screen, after the inputted command is interpreted through the voice/character recognition technique and is transformed to the control code of the appliance to be sent to the home appliance, the control code is sent to the home appliance to remotely control it. The function thereof may be extended to the environment capable of implementing the bi-directional communication with the appliance by receiving the control code from the appliance, while overcoming the limitation of the conventional terminal having a fixed function. In addition, since it is easy to add or delete the control function, a plurality of appliances can be effectively controlled by use of one terminal.

17 Claims, 6 Drawing Sheets

REMOTE CONTROL SYSTEM FOR HOME APPLIANCES AND METHOD THEREOF

BACKGROUND OF THE INVENTION

1. Field of the Invention

The present invention relates to system and method of remotely controlling several home appliances, and more particularly, to appliance remote control system and method utilizing a voice/character recognition technique.

2. Background of the Related Art

Home appliances and offices equipments in homes or offices which provide users with various facilities include a mobile terminal (remote controller) for remotely controlling the appliance in question at close range to easily control the corresponding appliance.

Considering conventional methods of remotely controlling the home appliances, the mobile terminal is provided with stationary buttons for sending a predetermined key value carrying out a function of the home appliance. The mobile terminal is specified for its purpose, and a separate mobile terminal is provided for a special appliance. Therefore, there is a problem in that the general homes must have a number of mobile terminals.

In addition, such home appliances and the mobile terminals are embedded with a simple controller (or micom), respectively. The embedded controller provides one-directional link between the terminal and appliance to control the home appliance by interpreting the key value sent by the mobile terminal.

Furthermore, since the mobile terminal has no a software processing function, it is not easy to add a high-grade function. Although there is a special mobile terminal supporting a common function, of which key values provided by several companies are previously inputted to control general purpose appliances such as a television set, a video tape recorder and the like, such a method limits a usable range of appliances. Also, in case of a new appliance or other article manufactured by other company, it is impossible to use the common mobile terminal because of compatibility.

SUMMARY OF THE INVENTION

Accordingly, the present invention is directed to appliance remote control system and method utilizing voice or character recognition technique that substantially obviates one or more problems due to limitations and disadvantages of the related art.

An object of the present invention is to provide system and method of remotely controlling various home appliances by inputting voice or character (handwriting) through one mobile terminal.

To achieve the object and other advantages, according to one aspect of the present invention, an appliance detects the approach of the terminal to set a connection relationship between the appliance and the terminal. If the appliance control command is inputted by a voice to control the appliance, the inputted voice command is transformed to a control code to be transmitted to the appliance, and the transformed control code is wirelessly transmitted to the appliance, thereby easily performing the remote control of the appliance.

Another aspect of the present invention, an appliance detects the approach of the terminal to set a connection relationship between the appliance and the terminal. If the appliance control command is inputted by a character to control the appliance, the inputted character command is transformed to a control code to be transmitted to the appliance, and the transformed control code is wirelessly transmitted to the appliance, thereby easily performing the remote control of the appliance.

According to another aspect of the present invention, a method of remotely controlling a plurality of home appliances using one mobile terminal, the method comprising the steps of: setting a network connection between the appliance and the terminal, when the terminal approaches within a certain distance from the appliance; if the network connection is set between the appliance and the terminal, receiving a plurality of control codes from the appliance; if a voice or character control command is inputted by a user to control the appliance, interpreting the inputted voice or character control command and transforming the command to a control code; and comparing the received control code with the transformed control code for controlling the appliance, and if the same control code exists, transmitting the corresponding control code to the appliance to be controlled through a radio protocol. The mobile terminal is at least any one of a PDA, an HPC, a cellular phone, a PCS, and a wireless remote controller. The radio protocol is at least any one of IR (infrared radiation) communication, Bluetooth, and radio frequencies.

The step of setting the network connection between the appliance and the terminal comprises steps of detecting whether the terminal approaches the appliance; and if the terminal approaches within a certain distance from the appliance, receiving an information related to the appliance transmitted from the corresponding appliance, and after storing the received information, setting the network connection between the appliance and the terminal. The information related to the appliance comprises at least any one of a manufacturing company, a model number, manufacturing data, a kind of appliance, an address of manufacturing company, and a telephone number of manufacturing company.

According to another aspect of the present invention, there is provided a method of controlling an appliance, comprising the steps of: detecting at a certain period whether a terminal for remotely controlling the appliance approaches the appliance; if the terminal approaches within a certain distance from the appliance, transmitting information related to the appliance and a control code to the terminal through a radio protocol, and setting a network connection between the appliance and the terminal; if the control code is received from the terminal through the radio protocol, comparing the received control code with a predetermined control code; and if the same control code exists, controlling a function of the appliance corresponding to the pertinent control code.

According to another aspect of the present invention, there is provided a system of remotely controlling a plurality of home appliances using one mobile terminal, the method comprising the steps of network managing means for setting a network connection between the terminal and one appliance to be controlled among the plurality of appliances; control command input means for inputting a voice or character control command for controlling one function of one appliance to be controlled; transmitting/receiving means for receiving detailed information related to the appliance and a control code from one appliance to be controlled through a radio protocol, and transmitting the appliance control code corresponding to the control command to the pertinent to be controlled through the radio protocol; and control code transforming means for transforming the voice or character control command inputted from the control command input means, and supplying the transformed command to the transmitting/receiving means. The system further comprises memory means for storing the information related to the appliance and the appliance control code received through the transmitting/receiving means; and display means for displaying control result information from the appliance and the control code received from the appliance.

The control command input means includes a voice input section of inputting the control command for controlling the appliance, and a character input section for directly writing and inputting the control command for controlling the appliance by handwriting.

According to another aspect of the present invention, there is provided an apparatus of controlling a home appliance by use of a control code supplied from a mobile terminal, the apparatus comprising: transmitting/receiving means for transmitting detailed information related to the appliance to the terminal through a radio protocol, and receiving a control code of the appliance transmitted from the terminal; detecting means for detecting approach of the terminal at a certain period; network connecting setting means for setting a network connection between the terminal and the appliance, if the terminal approaches within a certain distance from the detecting means; appliance controlling means for comparing the control code received through the transmitting/receiving means with a previously stored appliance control code, and in case of the controllable control code of the appliance, controlling a corresponding function of the appliance; and response processing means for generating result information, in case one function of the appliance is controlled by the appliance control means, and transmitting the information to the terminal through the transmitting/receiving means.

According to another aspect of the present invention, there is provided a computer-readable media having computer-executable instructions for performing the method of remotely controlling a plurality of home appliances using one mobile terminal, the method comprising the steps of: setting a network connection between the appliance and the terminal, when the terminal approaches within a certain distance from the appliance; if the network connection is set between the appliance and the terminal, receiving a plurality of control codes from the appliance; if a voice or character control command is inputted by a user for controlling the appliance, interpreting the inputted voice or character control command and transforming the command to a control code; and after comparing the received control code with the transformed control code for controlling the appliance, if the same control code exists, transmitting the corresponding control code to the appliance to be controlled through a radio protocol.

According to another aspect of the present invention, there is provided a computer-readable media having computer-executable instructions for performing the method of controlling an appliance, comprising the steps of: detecting at a certain period whether a terminal for remotely controlling the appliance approaches the appliance; if the terminal approaches within a certain distance from the appliance, transmitting information related to the appliance and a control code to the terminal through a radio protocol, and setting a network connection between the appliance and the terminal; if the control code is received from the terminal through the radio protocol, comparing the received control code with a predetermined control code; and if the same control code exists, controlling a function of the appliance corresponding to the pertinent control code.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Appliance remote control system and method according to the present invention will now be explained with reference to the accompanying drawings, in which a first embodiment is applied to appliance remote control system and method utilizing a voice recognition technique, and a second embodiment is applied to appliance remote control system and method utilizing a character (handwriting) recognition technique.

Prior to the description every embodiment, a relationship between various home appliances and mobile terminals will now be described with reference to FIG. 1.

Figure 1:
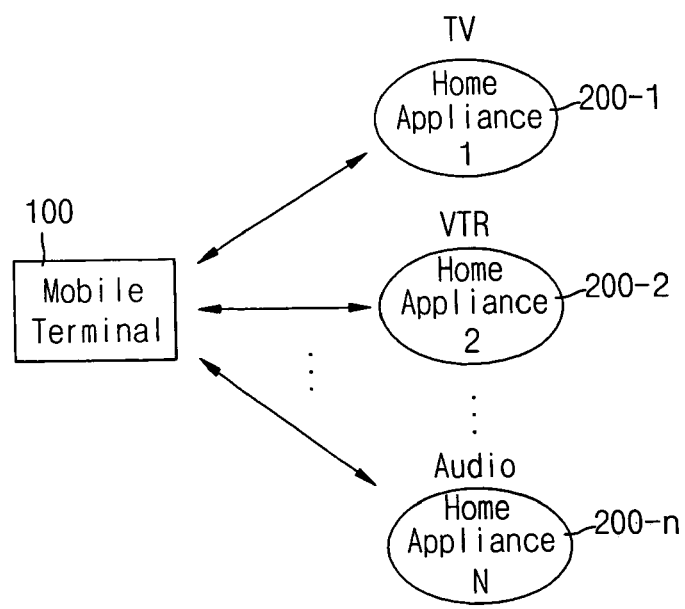
FIG. 1 is a view showing a connection relationship between various home appliances and a mobile terminal, to which the present invention is applied.

FIG. 1 is a view showing a connection relationship between various home appliances and the mobile terminal, to which the present invention is applied. Home appliances 200-1, 200-2, . . . , and 200-n includes a TV, a VTR, an audio equipment, a refrigerator and so forth, which a response software for controlling the home appliances and a message sending software for processing a control message and sending the result message. A terminal 100 includes a PDA embedded with processor such as SA1110, MIPS, MPC860, X860 and so forth, a portable terminal such as hand-held personal computer, a cellular phone supporting a data transmitting and receiving function, and an enhanced wireless remote controller. The program for controlling the home appliance may be installed in the system having various operating systems such as VxWorks, VRTX, Windows CE, Linux and so forth. A wireless transmission protocol between the home appliance and the mobile terminal includes infrared rays (IR or IrDA), Bluetooth, radio frequencies and so forth.

First Embodiment

The first embodiment relates to system and method of remotely controlling the home appliance by employing the voice recognition technique, and it is a technique belonging to a field of appliance control by communicating between the mobile terminal and the home appliance through a network, in which a control command is inputted by a voice, the inputted command is interpreted through the voice recognition technique and is transformed to a control code to be sent to the home appliance, and the control code is sent to the home appliance to remotely control it.

Conventional appliance remote control may control only a restricted range of home appliances through the mobile terminal having a fixed function. It is impossible to support the development of new home appliance. In addition, since it provides one directional link between the terminal and the appliance, there is a limitation in the control function of the appliance.

Therefore, the first embodiment of the present invention improves the efficiency of the control of the home appliance by utilizing the voice recognition technique in the appliance remote control, supports the bi-directional transmission function between the terminal and the appliance to overcome the limitation of the simple control function supporting only the one directional communication, reinforces the communication function between the appliance and the terminal to provide the compatibility, and provides the mobile terminal with a processor and a memory, thereby communicating with various home appliances and remotely controlling the appliances.

Disclosed is herein the appliance remote control system and method utilizing the mobile terminal embedded with the voice inputting function for controlling the home appliance, and this method may control a number of home appliances through one mobile terminal.

It will now be described on the appliance remote control system according to the first embodiment of the present invention with reference to FIG. 2.

Figure 2:
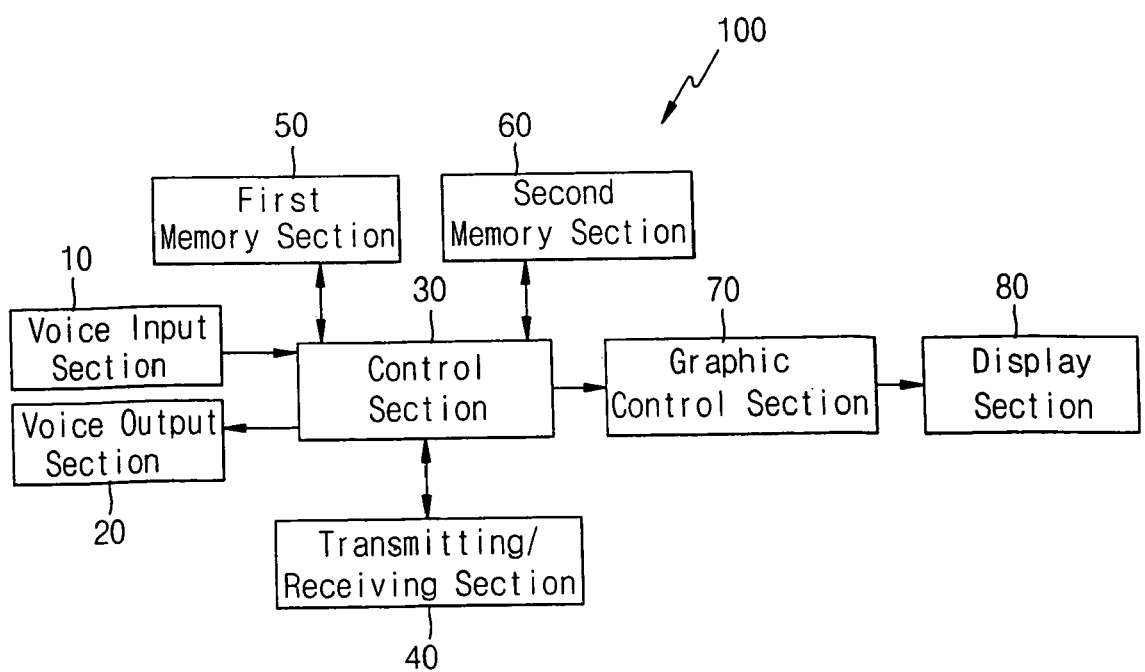
FIG. 2 is a block diagram illustrating the detailed structure of the mobile terminal shown in FIG. 1, in which an appliance remote control system utilizes a voice recognition technique according to a first preferred embodiment of the present invention.
Figure 3:
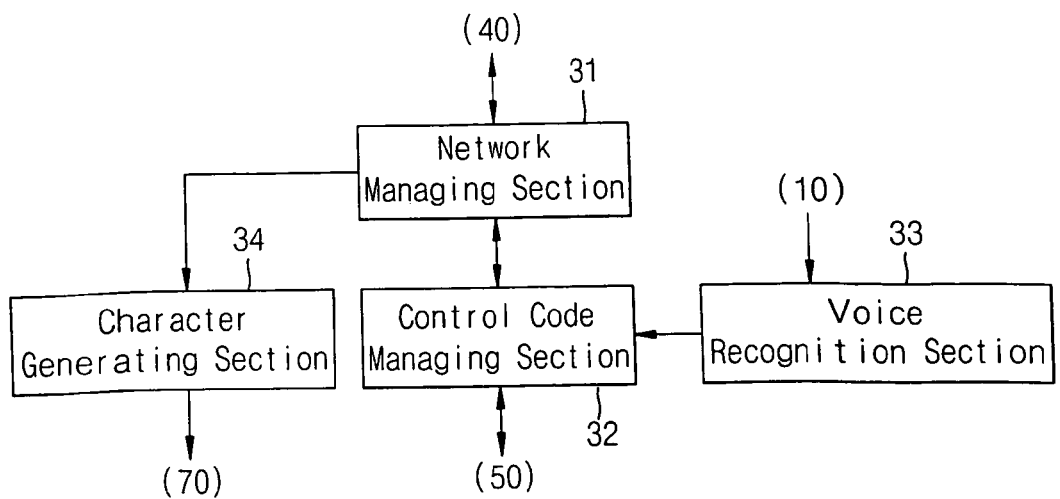
FIG. 3 is a block diagram illustrating the detailed structure of the control section shown in FIG. 2.

FIG. 2 is a block diagram illustrating the detailed structure of the mobile terminal shown in FIG. 1, in which the appliance remote control system utilizes the voice recognition technique according to the first preferred embodiment of the present invention, and FIG. 3 is a block diagram illustrating the detailed structure of the control section shown in FIG. 2. The mobile terminal 100 includes a voice input section 10, a voice output section 20, a control section 30, a transmitting/receiving section 40, first and second memory sections 50 and 60, a graphic control section 70, and a display section 80. The control section 30 includes, as shown in FIG. 3, a network managing section 31, a control code managing section 32, a voice recognition section 33 and a character generating section 34.

The voice input section 10 is to input the control command of one home appliance to be remotely controlled by the user, and includes a microphone.

The first memory section 50 stores the control code of the corresponding home appliance which is transmitted from the home appliance, and detailed information of the corresponding home appliance. The second memory section 60 stores a driving program for driving the control section 30, and a transmitting program for transmitting the control code related to the control command inputted by the user to the corresponding appliance.

The control section 30 recognizes the voice inputted through the voice input section 10, transforms the voice to the control code for controlling the appliance, and sends the transformed control code to the transmitting/receiving section 40, thereby sending it to the appliance. And then, it receives the detailed information on the corresponding appliance and various control codes transmitted from the appliance, and stores them in the first memory section 50. If the result message resulted from the controlled appliance is received from the appliance through the transmitting/receiving section 40, a character on the result message is produced and provided to the graphic control section 70.

The control section 30 sets the network connection with the appliance depending upon whether it approaches the appliance. In addition, if the network connection with the appliance is set, the control section 30 outputs the signal for inputting the voice through the voice output section 20, and controls the output of the result message through the voice output section 20.

The graphic control section 70 composes the character produced by the control section 30 with a predetermined graphics to display on the display section 80. Looking into picture construction displayed on the display section 80, the predetermined graphics is constructed, and a character message for inputting the voice command on the graphics is constructed. Also, a character message on the appliance remote control results may be displayed on the screen.

Explaining more in detail the construction of the control section 30 with reference to FIG. 3, the network managing section 31 of the control section 30 sets the network connection with the appliance depending upon whether it approaches the appliance, and provides the transmitting/receiving section 40 with the control code on the voice command of the user to send it to the corresponding appliance to be controlled. And then, it receives the detailed information on the corresponding appliance and various control codes transmitted from the appliance, and stores them in the first memory section 50 through the control code managing section 32. The first memory section 50 may include a flash memory. Also, the network managing section 31 generates an interrupter signal to setting the network connection with the appliance.

If the user inputs the voice command for controlling the appliance through the voice input section 10, the voice recognition section 33 recognizes the voice command, and transforms it to corresponding control code which is supplied to the control code managing section 32.

The control code managing section 32 performs a mapping operation between the control code of the appliance provided from the voice recognition section 32 and the control code of the corresponding appliance stored in the first memory section 50. If the mapping operation is performed, the corresponding control code is supplied to the transmitting/receiving section 40 through the network managing section 31. Accordingly, the transmitting/receiving section 40 wirelessly transmits the control code of the appliance provided through the network managing section 31 to the corresponding appliance.

If the network connection with a desired appliance to be controlled is performed in the network managing section 31, the character generating section 34 generates and supplies a voice command input character message for the appliance to the graphic control section 70 to be displayed on the display section 80. If the corresponding appliance is remotely controlled and the control result signal is received from the appliance, it generates the character corresponding to the result signal and supplies it to the graphic control section 70, so that it is composed with the predetermined graphics to be displayed on the display section 80.

It will now be described a control apparatus built-in the home appliance for controlling the corresponding the appliance in accordance with the control code wirelessly transmitted from the mobile terminal.

Figure 4:
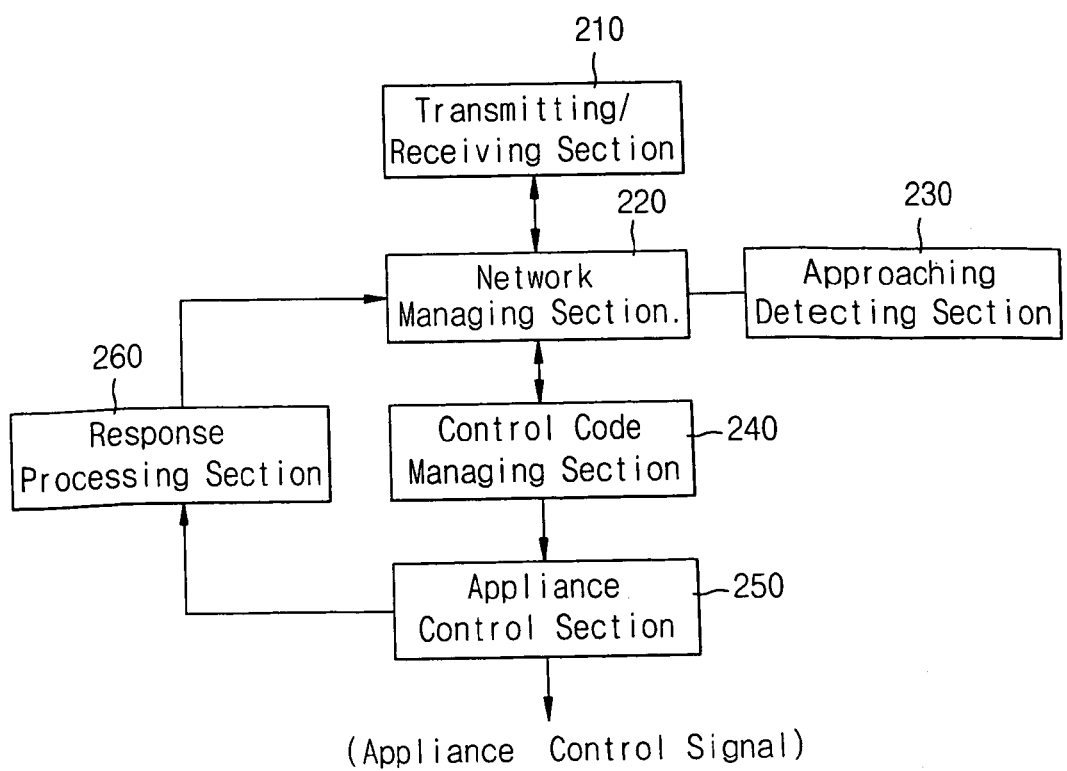
FIG. 4 is a block diagram illustrating a system of home appliances in the appliance remote control system according to the present invention.

FIG. 4 is a block diagram illustrating the system of controlling home appliances in the appliance remote control system according to the present invention, in which the system includes transmitting/receiving section 210, a network managing section 220, an approach detecting section 230, a control code managing section 240, an appliance control section 250, and a response processing section 260.

The approaching detecting section 230 detects whether the mobile terminal approaches or not, and supplies the detecting result signal to the network managing section 220.

The network managing section 220 determines the network connection with the terminal through the transmitting/receiving section 210 in accordance with the approach detecting result signal provided from the approach detecting section 230.

The transmitting/receiving section 210 wirelessly transmits the information related to the appliance, the control code and the appliance control result information to the mobile terminal, and receives the control code information for controlling the appliance transmitted from the terminal.

The control code managing section 240 stores the control code of the appliance and the detailed information related to the appliance. At setting the network connection with the terminal, the control code managing section 240 wirelessly transmits the corresponding information to the terminal through the transmitting/receiving section 210. If the corresponding control code is existed by comparing the control code transmitted from the terminal with the predetermined control code, it supplies the control signal for controlling the corresponding function of the appliance to the appliance control section 250.

The appliance control section 250 controls the corresponding function in accordance with the control signal provided from the control code managing section 240, and outputs the control result information to the response processing section 260.

The response processing section 260 generates a response character signal corresponding to the appliance control result signal provided from the appliance control section 250, and wirelessly transmits it to the terminal through the network managing section 220 and the transmitting/receiving section 210.

The operation of the appliance remote control system according to the first embodiment of the present invention will now be described.

First of all, the appliance determines whether the interrupt of the mobile terminal occurs or not.

If no interrupt occurs in the mobile terminal, the approach detecting section 230 detects whether the terminal approaches within a certain distance by polling the approach detection of the terminal.

As the approach detecting result of the terminal at the approach detecting section 230, if the terminal approaches within a certain distance, the approach detecting section 230 supplies the detecting signal to the control code managing section 240, and the control code managing section 240 sends the previously stored detailed information, i.e., the information related to the appliance, to the terminal 100 through the network managing section 220 and the transmitting/receiving section 210.

Accordingly, the transmitting/receiving section 210 of the terminal 100 receives the information related to the appliance, and supplies it to the network managing section 31 of the control section 30. At that time, if the network managing section 31 receives the information related to the appliance, it supplies the receiving result information to the appliance through the transmitting/receiving section 40, and stores the received information related to the appliance to the first memory section 50 through the control code managing section 32. The information related to the appliance may include a manufacturing company, a model number, manufacturing data, an address of manufacturing company, a telephone number of manufacturing company and so forth.

If the information related to the appliance is normally sent to the terminal, the network connection with the appliance is set.

In state of setting the network connection between the appliance and the terminal, the control code managing section 240 of the appliance sends the predetermined control code to the terminal through the transmitting/receiving section 210, and simultaneously, switches a mode thereof to a receiving mode.

Accordingly, the transmitting/receiving section 40 of the terminal 100 receives the control code transmitted from the appliance, stores it with the information related to the corresponding appliance in the first memory section 50. Wherein, the control code includes control codes to a number of functions of the appliance.

In state of setting the network connection between the appliance and the terminal, if the control code of the appliance is stored in the first memory section 50 of the terminal, the character generating section 34 of the terminal generates the voice control command input character for controlling the appliance, so that it displays on the display section 80 together with the graphics set at the graphic control section 70. At that time, the voice message for requiring the voice input of the user to control the appliance may be outputted through the voice output section 20, as well as generating the character. The control code may be displayed on the display 80, so that the user easily inputs the voice command for controlling the appliance by generating the control code for controlling the appliance as the character.

Accordingly, the user inputs the voice command for controlling the appliance through the voice input section 10.

If the voice command signal is inputted, the voice recognition section 33 of the control section 30 interprets the inputted voice command of the user, and transforms the corresponding voice command to the control code of the appliance to supply it to the control code managing section 32.

The control code managing section 32 compares the control code supplied from the voice recognition section 33 with the control code of the appliance stored in the first memory section 50. If the corresponding control code exists, it is sent to the corresponding appliance through the network managing section 31 and the transmitting/receiving section 40.

The transmitting/receiving section 210 of the appliance receives the control code of the appliance transmitted from the terminal, and supplies it to the control code managing section 240 through the network managing section 220.

The control code managing section 240 compares the received control code with the previously stored control code to determine whether the identical control code exists or not.

As the result, if the identical control code exists, the control code mandating section 240 supplies the control signal of the appliance corresponding to the control signal in question to the control section 250 of the appliance to control the pertinent function of the appliance.

In case the function of the appliance which is wanted by the user is controlled through the control section 250 of the appliance, the response processing section 260 generates control result signal of the corresponding function of the appliance, and sends it to the terminal through the network managing section 220 and the transmitting/receiving section 210.

The transmitting/receiving section 40 of the terminal receives the result signal, and supplies it to the character generating section 34 through the network managing section 31. The character generating section 34 generates the character to the control result of the appliance, and the character is composed with the graphic data set in the graphic control 70 and is displayed on the display section 80. At that time, as the contents of the display, for example, the character message "a volume of the audio has adjusted" is displayed.

The control result of the appliance may be outputted as the voice through the voice output section 20, as well as the character. Accordingly, the user easily identifies the control of the appliance through the voice or displayed character.

The appliance remote control method according to the first embodiment of the present invention corresponding to the operation of the appliance remote control system will now be described with reference to the accompanying drawings, with dividing the method into one carrying out in the appliance and another carrying out in the terminal.

Figure 5:
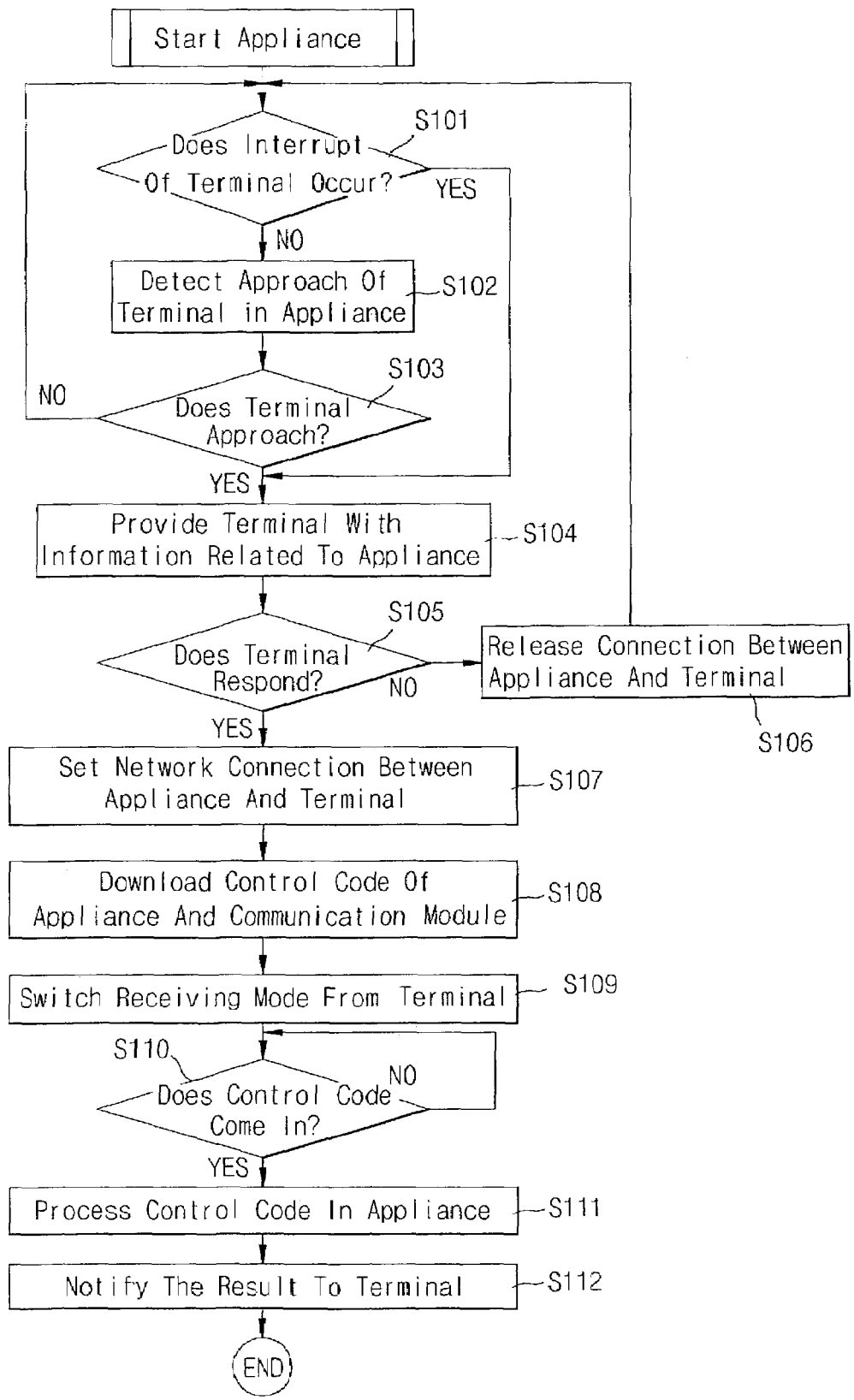
FIG. 5 is a flow chart showing the operation of a home appliance by the method of remotely controlling home appliances using a voice recognition technique according to the first embodiment of the present invention.

FIG. 5 is a flow chart showing the operation of the home appliance by the method of remotely controlling home appliances using the voice recognition technique according to the first embodiment of the present invention.

First of all, the appliance determines whether the interrupt of the mobile terminal occurs or not (step S101).

As the result, if the interrupt of the terminal occurs, the polling is performed to detect whether the terminal approaches the appliance (step S102).

As the result, if the terminal approaches within a certain distance of the appliance (step S103), the information related to the appliance, for example, the manufacturing company, the model number, manufacturing data, the address of manufacturing company, the telephone number of manufacturing company and so forth, is sent to the terminal (step S104).

If the information related to the appliance is sent, the appliance determines whether the terminal responses or not (step S105). If the terminal normally receives the information related to the appliance, in other words, if the terminal responses, the network connection is set to perform the data communication between the appliance and the terminal (step S107).

If the terminal no responses in spite of the reception of the information related to the appliance, after the network connection between the appliance and the terminal is released, the process is feedback to the step S101 to check whether the interrupt of the terminal occurs or not.

If the network connection between the appliance and the terminal is set, after the appliance wirelessly sends the control code to the terminal (step S108), it is switched to a receiving mode (step S109).

It is determined whether or not the control code for controlling the appliance is wirelessly received from the terminal (step S110).

If the control code is received, the received control code is compared with the control code oneself to determine whether it is possible to control the appliance. If the received control code is identified as the control code capable of controlling the appliance, it controls the function corresponding to the pertinent control code (step S111).

If the control of the appliance is completed, the control completion result information of the appliance wirelessly sends to the terminal so that the user easily identifies the control result (step S112).

Figure 6:
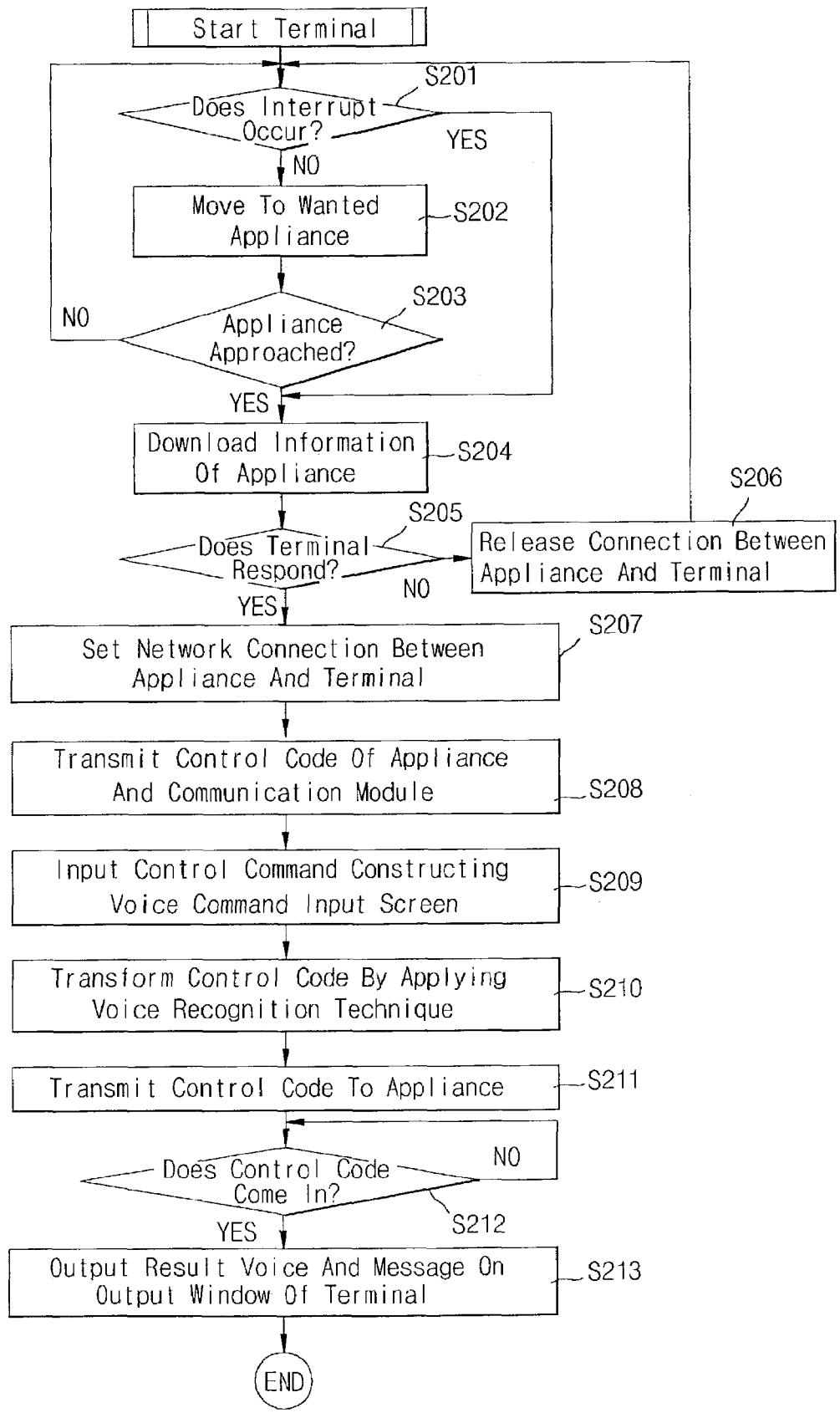
FIG. 6 is a flow chart showing the operation of a mobile terminal by the method of remotely controlling home appliances using a voice recognition technique according to the first embodiment of the present invention.

FIG. 6 is a flow chart showing the operation of the mobile terminal by the method of remotely controlling home appliances using a voice recognition technique according to the first embodiment of the present invention.

First of all, the terminal determines whether the interrupt occurs or not (step S201).

If the interrupt no occurs, the user having the terminal moves to the appliance to be controlled (step S202).

It is determined whether the terminal approaches the appliance (step S203). If the terminal approaches the appliance, the terminal downloads the information related to the appliance transmitted from the appliance (step S204). In other words, it is determined whether the terminal normally receives the information related to the appliance transmitted from the appliance (step S205).

If the terminal does not normally receive the information related to the appliance transmitted from the appliance, the network connection between the appliance and the terminal is released (step S206). On the contrary, if the terminal normally receives the information related to the appliance transmitted from the appliance, the network connection between the appliance and the terminal is set (step S207).

In state of setting the network connection between the appliance and the terminal, the control code transmitted from the appliance is received and stored (step S208).

In state the control code of the appliance is stored, the voice input message for allowing the user to control the appliance is displayed, or the voice signal for allowing the appliance control command to input is outputted.

The user listens to the voice command input signal outputted as the voice signal or screen displayed on the display section, and inputs the voice command for controlling the appliance (step S209).

If the voice command is inputted for controlling the appliance, the inputted voice command generates the control code corresponding to the voice command by use of the voice recognition technique. Specifically, the inputted voice command is transformed to the control code (step S210).

The transformed control code is wirelessly transmitted to the terminal so that the user controls the corresponding function of the appliance which is wanted by the user (step S211).

It is determined whether the corresponding function is controlled and the control result information is received from the appliance (step S212). If the appliance control result information is received, the control result information is displayed or outputs as the voice signal so that the user easily identifies the control result (step S213).

After all, with the first embodiment of the present invention, the appliance detects the approach of the terminal, and the connection relationship between the appliance and the terminal is set. If the appliance control command is inputted by the voice to control the appliance, the inputted voice command is transformed to the control code to be transmitted to the appliance, and the transformed control code is wirelessly transmitted to the appliance, thereby easily performing the remote control of the appliance.

Second Embodiment

The second embodiment relates to system and method of remotely controlling the home appliance by employing the handwriting recognition technique to the mobile terminal, and it is a technique belonging to a field of appliance control by communicating between the mobile terminal and the home appliance through a network, in which a control command is inputted by handwriting, the inputted command is interpreted through the handwriting recognition technique and is transformed to a control code to be sent to the home appliance, and the control code is sent to the home appliance to remotely control it.

The second embodiment of the present invention improves the efficiency of the control of the home appliance by utilizing the handwriting recognition technique in the appliance remote control, supports the bi-directional transmission function between the terminal and the appliance to overcome the limitation of the simple control function supporting only the one directional communication, reinforces the communication function between the appliance and the terminal to provide the compatibility, and provides the mobile terminal with a processor and a memory, thereby communicating with various home appliances and remotely controlling the appliances.

Figure 7:
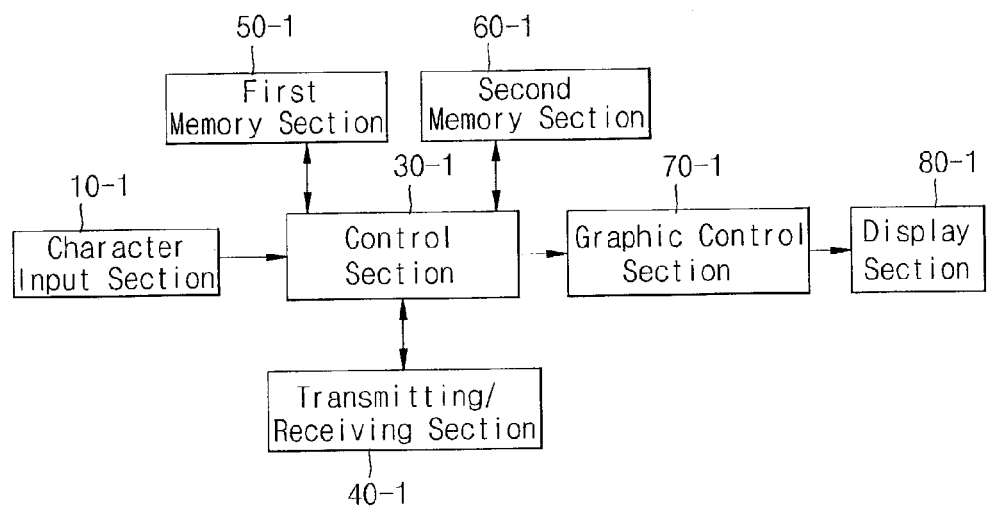
FIG. 7 is a block diagram illustrating the detailed structure of the mobile terminal shown in FIG. 1, in which an appliance remote control system utilizes a character recognition technique according to a second preferred embodiment of the present invention.
Figure 8:
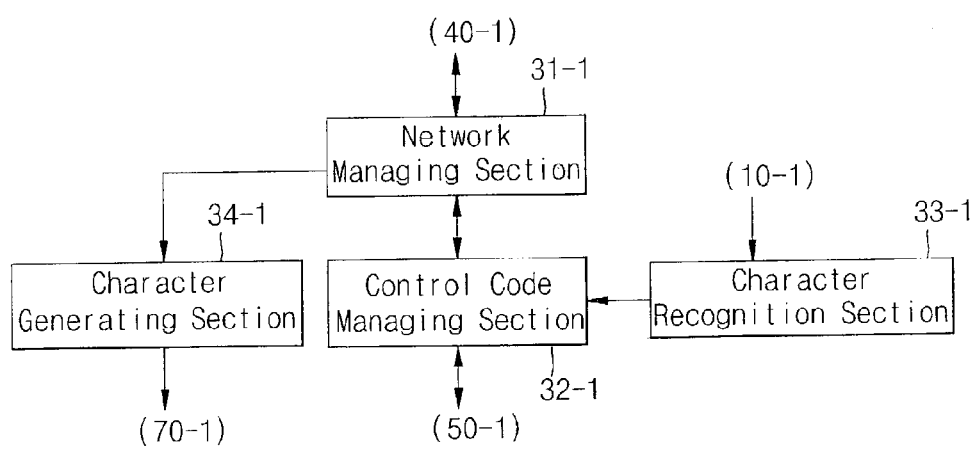
FIG. 8 is a block diagram illustrating the detailed structure of the control section shown in FIG. 7.
Figure 9:
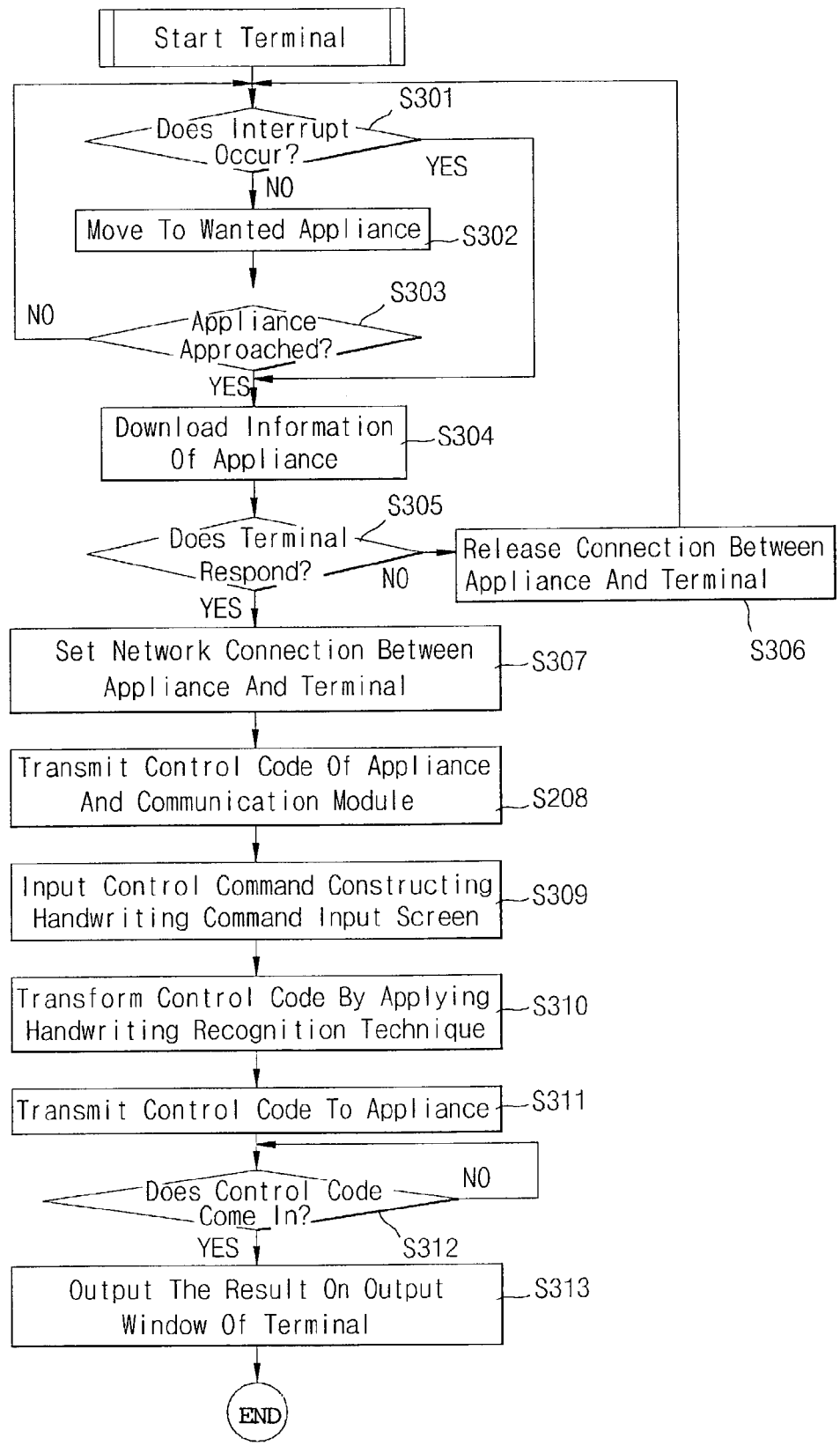
FIG. 9 is a flow chart showing the operation of a mobile terminal by the method of remotely controlling home appliances using the character recognition technique according to the second embodiment of the present invention.

Disclosed is herein the appliance remote control system and method utilizing the mobile terminal embedded with the handwriting input screen for controlling the home appliance, in which since the screen does not require a colorful graphic interface environment, it can reduce the memory capability of the terminal, and this method may control a number of home appliances through one mobile terminal FIG. 7 is a block diagram illustrating the detailed structure of the mobile terminal shown in FIG. 1, in which the appliance remote control system utilizes the handwrite recognition technique according to the second preferred embodiment of the present invention, and FIG. 8 is a block diagram illustrating the detailed structure of the control section shown in FIG. 7. The mobile terminal 100 includes a character input section 10-1, a control section 30-1, a transmitting/receiving section 40-1, first and second memory sections 50-1 and 60-1, a graphic control section 70-1, and a display section 80-1. The control section 30-1 includes, as shown in FIG. 8, a network managing section 31-1, a control code managing section 32-1, a character recognition section 33-1 and a character generating section 34-1.

The character input section 10-1 is to input the control command of one home appliance to be remotely controlled by the user, and is adapted such that the user inputs the control command through an input (handwriting character input).

The first memory section 50-1 stores the control code of the corresponding home appliance which is transmitted from the home appliance, and detailed information of the corresponding home appliance. The second memory section 60-1 stores a driving program for driving the control section 30-1, and a transmitting program for transmitting the control code related to the control command inputted by the user to the corresponding appliance.

The control section 30-1 recognizes the voice inputted through the character input section 10-1, transforms the voice to the control code for controlling the appliance, and sends the transformed control code to the transmitting/receiving section 40-1, thereby sending it to the appliance. And then, it receives the detailed information on the corresponding appliance and various control codes transmitted from the appliance, and stores them in the first memory section 50-1. If the result message resulted from the controlled appliance is received from the appliance through the transmitting/receiving section 40-1, a character on the result message is produced and provided to the graphic control section 70-1.

The control section 30-1 sets the network connection with the appliance depending upon whether it approaches the appliance. In addition, if the network connection with the appliance is set, the control section 30-1 displays a message input request for controlling the appliance on the display section 80-1.

The graphic control section 70-1 composes the character produced by the control section 30-1 with a predetermined graphics to display on the display section 80-1. Looking into picture construction displayed on the display section 80-1, the predetermined graphics is constructed, and a character message for inputting the voice command on the graphics is constructed. Also, a character message on the appliance remote control results may be displayed on the screen.

Explaining more in detail the construction of the control section 30-1 with reference to FIG. 8, the network managing section 31-1 of the control section 30-1 sets the network connection with the appliance depending upon whether it approaches the appliance, and provides the transmitting/receiving section 40-1 with the control code on the character control command of the user to send it to the corresponding appliance to be controlled. And then, it receives the detailed information on the corresponding appliance and various control codes transmitted from the appliance, and stores them in the first memory section 50-1 through the control code managing section 32-1. The first memory section 50-1 may include a flash memory. Also, the network managing section 31-1 generates an interrupter signal to setting the network connection with the appliance.

If the user inputs the voice command for controlling the appliance through the character input section 10-1, the character command is transformed to corresponding control code, and is supplied to the control code managing section 32-1.

The control code managing section 32-1 performs a mapping operation between the control code of the appliance provided from the character recognition section 32-1 and the control code of the corresponding appliance stored in the first memory section 50-1. If the mapping operation is performed, the corresponding control code is supplied to the transmitting/receiving section 40-1 through the network managing section 31-1. Accordingly, the transmitting/receiving section 40-1 wirelessly transmits the control code of the appliance provided through the network managing section 31-1 to the corresponding appliance.

If the network connection with a desired appliance to be controlled is performed in the network managing section 31-1, the character generating section 34-1 generates and supplies a character command input character message for the appliance to the graphic control section 70-1 to be displayed on the display section 80-1. If the corresponding appliance is remotely controlled and the control result signal is received from the appliance, it generates the character corresponding to the result signal and supplies it to the graphic control section 70-1, so that it is composed with the predetermined graphics to be displayed on the display section 80-1.

The control apparatus built-in the home appliance for controlling the corresponding the appliance in accordance with the control code wirelessly transmitted from the mobile terminal is substantially similar to that of the first embodiment of the present invention shown in FIG. 4, the description of which will be omitted.

The operation of the appliance remote control system according to the second embodiment of the present invention will now be described.

First of all, the appliance determines whether the interrupt of the mobile terminal occurs or not.

If no interrupt occurs in the mobile terminal, the approach detecting section 230 detects whether the terminal approaches within a certain distance by polling the approach detection of the terminal.

As the approach detecting result of the terminal at the approach detecting section 230, if the terminal approaches within a certain distance, the approach detecting section 230 supplies the detecting signal to the control code managing section 240, and the control code managing section 240 sends the previously stored detailed information, i.e., the information related to the appliance, to the terminal 100 through the network managing section 220 and the transmitting/receiving section 210.

Accordingly, the transmitting/receiving section 210 of the terminal 100 receives the information related to the appliance, and supplies it to the network managing section 31-1 of the control section 30-1. At that time, if the network managing section 31-1 receives the information related to the appliance, it supplies the receiving result information to the appliance through the transmitting/receiving section 40-1, and stores the received information related to the appliance to the first memory section 50-1 through the control code managing section 32-1. The information related to the appliance may include a manufacturing company, a model number, manufacturing data, an address of manufacturing company, a telephone number of manufacturing company and so forth.

If the information related to the appliance is normally sent to the terminal, the network connection with the appliance is set.

In state of setting the network connection between the appliance and the terminal, the control code managing section 240 of the appliance sends the predetermined control code to the terminal through the transmitting/receiving section 210, and simultaneously, switches a mode thereof to a receiving mode.

Accordingly, the transmitting/receiving section 40-1 of the terminal 100 receives the control code transmitted from the appliance, stores it with the information related to the corresponding appliance in the first memory section 50-1. Wherein, the control code includes control codes to a number of functions of the appliance.

In state of setting the network connection between the appliance and the terminal, if the control code of the appliance is stored in the first memory section 50-1 of the terminal, the character generating section 34-1 of the terminal generates the character input request message (character) for controlling the appliance, so that it displays on the display section 80-1 together with the graphics set at the graphic control section 70-1.

Also, the control code for controlling the appliance may be displayed on the display 80-1 as the character, so that the user selects the corresponding function of the appliance. At that time, the display section 80-1 may have a type of touch screen.

Accordingly, the user inputs the character control command for controlling the appliance through the character input section 10-1.

If the character control command is inputted, the character recognition section 33-1 of the control section 30-1 interprets the inputted character command of the user, and transforms the corresponding character command to the control code of the appliance to supply it to the control code managing section 32-1.

The control code managing section 32-1 compares the control code supplied from the character recognition section 33-1 with the control code of the appliance stored in the first memory section 50-1. If the corresponding control code exists, it is sent to the corresponding appliance through the network managing section 31-1 and the transmitting/receiving section 40-1.

The transmitting/receiving section 210 of the appliance receives the control code of the appliance transmitted from the terminal, and supplies it to the control code managing section 240 through the network managing section 220.

The control code managing section 240 compares the received control code with the previously stored control code to determine whether the identical control code exists or not.

As the result, if the identical control code exists, the control code mandating section 240 supplies the control signal of the appliance corresponding to the control signal in question to the control section 250 of the appliance to control the pertinent function of the appliance.

In case the function of the appliance which is wanted by the user is controlled through the control section 250 of the appliance, the response processing section 260 generates control result signal of the corresponding function of the appliance, and sends it to the terminal through the network managing section 220 and the transmitting/receiving section 210.

The transmitting/receiving section 40-1 of the terminal receives the result signal, and supplies it to the character generating section 34-1 through the network managing section 31-1. The character generating section 34-1 generates the character to the control result of the appliance, and the character is composed with the graphic data set in the graphic control 70-1 and is displayed on the display section 80-1.

The control result of the appliance may be outputted as the voice through a loudspeaker, as well as the character. Accordingly, the user easily identifies the control of the appliance through the voice or displayed character.

The appliance remote control method according to the second embodiment of the present invention corresponding to the operation of the appliance remote control system will now be described with reference to the accompanying drawings. Since the method implemented in the appliance is substantially similar to the flow shown in FIG. 5, the description thereof will be omitted. The method implemented in the terminal will now be described.

FIG. 8 is a flow chart showing the operation of the mobile terminal by the method of remotely controlling home appliances using the character recognition technique according to the second embodiment of the present invention.

First of all, the terminal determines whether the interrupt occurs or not (step S301).

If the interrupt no occurs, the user having the terminal moves to the appliance to be controlled (step S302).

It is determined whether the terminal approaches the appliance (step S303). If the terminal approaches the appliance, the terminal downloads the information related to the appliance transmitted from the appliance (step S304). In other words, it is determined whether the terminal normally receives the information related to the appliance transmitted from the appliance (step S305).

If the terminal does not normally receive the information related to the appliance transmitted from the appliance, the network connection between the appliance and the terminal is released (step S306). On the contrary, if the terminal normally receives the information related to the appliance transmitted from the appliance, the network connection between the appliance and the terminal is set (step S307).

In state of setting the network connection between the appliance and the terminal, the control code transmitted from the appliance is received and stored (step S308).

In state the control code of the appliance stored, the character command input request message for allowing the user to control the appliance is displayed. In other words, it constructs the handwriting command input screen.

The user inputs the handwriting character command for controlling the appliance in accordance with the displayed handwriting input screen (step S309).

If the character command is inputted for controlling the appliance, the inputted character command generates the control code corresponding to the character command by use of the character recognition technique. Specifically, the inputted character command is transformed to the control code (step S310).

The transformed control code is wirelessly transmitted to the terminal so that the user controls the corresponding function of the appliance which is wanted by the user (step S311).

It is determined whether the corresponding function is controlled and the control result information is received from the appliance (step S312). If the appliance control result information is received, the control result information is displayed on the display section (step S313).

After all, with the second embodiment of the present invention, the appliance detects the approach of the terminal, and the connection relationship between the appliance and the terminal is set. If the appliance control command is inputted by the character to control the appliance, the inputted character command is transformed to the control code to be transmitted to the appliance, and the transformed control code is wirelessly transmitted to the appliance, thereby easily performing the remote control of the appliance.

With the description of the system and method of remotely controlling the home appliance by employing the voice/character recognition technique according to the present invention, it detects the connection relationship between the appliance and the mobile terminal and dynamically transmits the control code and a module for transmission. If the appliance control command is inputted through the voice control command input screen or the handwriting control command input screen, after the inputted command is interpreted through the voice/character recognition technique and is transformed to the control code of the appliance to be sent to the home appliance, the control code is sent to the home appliance to remotely control it. The function thereof may be extended to the environment capable of implementing the bi-directional communication with the appliance by receiving the control code from the appliance, while overcoming the limitation of the conventional terminal having a fixed function. In addition, since it is easy to add or delete the control function, a plurality of appliances can be effectively controlled by use of one terminal.

Since the mobile terminal employs the voice/character recognition technique for controlling the appliance, it may is provided with the blind person.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of remotely controlling a plurality of home appliances using one mobile terminal, the method comprising:
   setting a network connection between the appliance and the terminal, when the terminal approaches within a certain distance from the appliance;
   receiving information related to the appliance and a plurality of predefined control codes if the network connection is set between the appliance and the terminal;
   inputting voice or character control command in the terminal to control the appliance;
   interpreting the inputted voice or character control command through a recognition process;
   transforming the command to a corresponding control code with the received predefined control codes supplied by the appliance;
   comparing a transformed control code with the received predefined control codes supplied by the appliance;
   transmitting the corresponding control code to the appliance in case of the controllable control code of the appliance through a radio protocol;
   processing the control code by the appliance, generating the control result of the corresponding function of the appliance and transmitting it to the terminal; and
   receiving the control results by the terminal and showing it.

2. The method as claimed in claim 1, wherein the mobile terminal is at least any one of a PDA, an HPC, a Cellular Phone, a PCS, and a wireless remote controller.

3. The method as claimed in claim 1, wherein the radio protocol is at least any one of infrared rays communication, Bluetooth, and radio frequency.

4. The method as claimed in claim 1, wherein the step of setting the network connection between the appliance and the terminal comprises steps of detecting whether the terminal approaches the appliance; and if the terminal approaches within a certain distance from the appliance, receiving an information related to the appliance transmitted from the corresponding appliance, and after storing the received information, setting the network connection between the appliance and the terminal.

5. The method as claimed in claim 4, wherein the information related to the appliance comprises at least any one of a manufacturing company, a model number, manufacturing data, a kind of appliance, an address of manufacturing company, and a telephone number of manufacturing company.

6. The method as claimed in claim 1, further comprising, after wirelessly transmitting the control code to the appliance, receiving control result information from the corresponding appliance and display the information to identify the control result by the user.

7. The method as claimed in claim 6, wherein the appliance control result information is displayed on a screen or is outputted as a voice.

8. The method as claimed in claim 1, wherein the control code received from the appliance is stored in a memory, and simultaneously, is displayed to allow the user to identify the control code.

9. A method of controlling an appliance, comprising:
checking the interrupt of the mobile terminal occurs or not by the appliance; detecting whether the mobile terminal approaches within a certain distance for a period by polling to check the approach of the terminal if no interrupt occurs;
setting a network connection between the appliance and the terminal by transmitting information related to the appliance from the appliance to the terminal through a radio protocol;
transmitting a plurality of predefined control codes to the terminal through a radio protocol;
inputting voice or character control command in the terminal to control the appliance;
interpreting the inputted voice or character control command through recognition process;
transforming the control command to a control code to control the appliance;
comparing the transformed control code with the received predefined control codes;
transmitting the control code to the appliance in case of the controllable control code of the appliance;
controlling a function of the appliance if corresponding control code exists;
generating the control result controlled by the appliance and transmitting the information to the terminal; and
receiving the control result by the terminal and showing it.

10. The method as claimed in claim 9, wherein the step of setting the network connection between the appliance and the terminal comprises a step of switching to a receiving mode from the terminal.

11. The method as claimed in claim 9, wherein the information related to the appliance comprises at least any one of a manufacturing company, a model number, manufacturing data, a kind of appliance, an address of manufacturing company, and a telephone number of manufacturing company.

12. The method as claimed in claim 9, further comprising the step of after controlling the function of the appliance, transmitting control result information to the terminal through a radio protocol.

13. The method as claimed in claim 9, wherein the radio protocol is at least any one of infrared rays communication, Bluetooth, and radio frequency.

14. An apparatus of controlling a home appliance by use of a control code supplied from a mobile terminal, the apparatus comprising:
transmitting/receiving means for transmitting, from the appliance, detailed information related to the appliance to the terminal through a radio protocol, and receiving a plurality of control codes from the appliance transmitted to the terminal;
detecting means for detecting approach of the mobile terminal within a certain distance for a certain period through polling;
network connection setting means for setting a network connection between the terminal and the appliance, if the terminal approaches to the appliance within a certain distance;
input means for inputting control commands using voice or character and for transforming it to the corresponding control code for controlling the appliance;
appliance controlling means for comparing the control codes received through the transmitting/receiving means with an inputted control code and in case of the controllable control code of the appliance, transmitting it to the appliance controlling a corresponding function of the appliance; and
response processing means for generating the control result controlled by the appliance controlling means, and transmitting the information to the terminal through, the transmitting/receiving means.

15. The apparatus as claimed in claim 14, further comprising memory means for storing the information related to the appliance and the control code.

16. The apparatus as claimed in claim 14, wherein the radio protocol uses at least any one of infrared rays communication, Bluetooth, and radio frequency.

17. A computer-readable media having computer-executable instructions for performing the method of controlling an appliance, comprising:
checking the interrupt of the mobile terminal occurs or not by the appliance;
detecting whether the mobile terminal approaches within a certain distance for a certain period by polling to check the approach of the terminal if no interrupt occurs;
setting a network connection between the appliance and the terminal by transmitting information related to the appliance to the terminal through a radio protocol;
transmitting a plurality of pre-defined control codes to the terminal through a radio protocol;
inputting voice or character control command in the terminal to control the appliance;
interpreting the inputted voice or character control command through the recognition process;
transforming the control command to a corresponding control code to control the appliance;
comparing the transformed control code to the appliance in case of the controllable control code of the appliance;
controlling a function of the appliance if corresponding control code exists;
generating result information controlled by the appliance and transmitting the information to the terminal; and
receiving the control result information by the terminal and showing it.

* * * * *